United States Patent [19]

Lopes et al.

[11] Patent Number: 4,779,353
[45] Date of Patent: Oct. 25, 1988

[54] TOOL FOR MEASURING INCLINATION AND ROTATION

[75] Inventors: Jose C. B. Lopes, Cambridge, England; Gary S. Stumolo, Tulsa, Okla.; Warren F. Ziehl, Brookfield, Conn.; Benoit Couet, Cambridge, England

[73] Assignee: Schlumberger Technology Corporation, New York, N.Y.

[21] Appl. No.: 30,949

[22] Filed: Mar. 26, 1987

[51] Int. Cl.$^4$ .............................................. G01C 9/06
[52] U.S. Cl. .................................................... 33/366
[58] Field of Search ................ 33/302, 304, 312, 313, 33/366, 377; 175/45

[56] References Cited

U.S. PATENT DOCUMENTS

| | | | |
|---|---|---|---|
| 1,859,222 | 5/1932 | Rogers | 33/312 |
| 2,440,189 | 4/1948 | Zworykin | 33/366 |
| 3,290,786 | 12/1966 | Parkin | 33/366 |
| 3,478,437 | 11/1969 | Cothran | 33/366 |
| 4,028,815 | 6/1977 | Buckley et al. | 33/366 |
| 4,583,296 | 4/1986 | Dell'Acqua | 33/366 |

FOREIGN PATENT DOCUMENTS

| | | | |
|---|---|---|---|
| 1176172 | 8/1985 | U.S.S.R. | 33/366 |
| 2110374 | 6/1983 | United Kingdom | 33/366 |

Primary Examiner—Harry N. Haroian
Attorney, Agent, or Firm—David P. Gordon; Clifford L. Tager; Keith G. W. Smith

[57] ABSTRACT

A tool is provided for measuring the angles of inclination and rotation of the tool itself, especially for use in a borehole. The tool preferably comprises an electrically nonconductive cylindrical chamber containing a conductive fluid and a nonconductive fluid which together fill the chamber; at least two wires oriented parallel to the longitudinal axis of the chamber and located about the circumference of the chamber at other than 180 degrees apart from each other, such that the surface interface between the conductive and nonconductive fluids may be defined by a point along each of the two wires along with a third point on the surface; and electrical means attached to the wires for sensing an electrical characteristic of the wires corresponding to the points along the wires defined by the fluid interface; and means for using the sensed electrical characteristics of the wires, a knowledge of the chamber radius, and a knowledge of the third point, and determining therefrom an index of inclination of said chamber. Preferably, the means for using the sensed electrical characteristics to determine an index of inclination also uses the sensed electrical characteristics of the wire and a knowledge of the third point to provide an index of rotation of the chamber. The electrical characteristics are typically resistance values which can be determined by injecting current into the wires and determining a resulting voltage.

20 Claims, 4 Drawing Sheets

$V^* =$ VOLTAGE GIVEN BY CENTRAL WIRE

TOOL FOR MEASURING INCLINATION AND ROTATION

BACKGROUND OF THE INVENTION

The present invention generally relates to a single tool capable of acting as an inclinometer and rotational gauge, and more particularly to a tool and method for obtaining angular information such as the inclination and rotation of an object. The present invention also particularly relates to a borehole or well surveying tool for measuring deviations of the borehole or well from the vertical after or while drilling, and for determining the rotational orientation of a tool string in the borehole or well.

In drilling holes for exploration and extraction of oil or gas, it is highly desirable to determine the exact amount of deflection of the drilled hole from the vertical. Even after a borehole has been drilled, and when tool strings are inserted downhole it is often desirable to know both the angle of inclination of the borehole tool and the borehole itself. Indeed, while investigating a borehole, it is desirable to also determine the angular orientation of the tool within the borehole, as such a determination would permit a better circumferential resolution and hence a more complete analysis of the borehole. Moreover, even after the borehole has been cased, and production has begun, it is often desirable to determine the angle of inclination of the borehole and casing as the readings of many production tools may be affected by the inclination. For example, where multiphase fluids are flowing in a well, an inclination of as little as two degrees can cause a downflow or countercurrent flow in the pipe. Likewise, it may be important to determine the rotation of the tool in the well as some tools such as radioactive tracer tools require such knowledge.

Various inclinometers arranged especially for borehole use are known in the art. For example, U.S. Pat. No. 2,103,235, to J. Conrad discloses a device which includes a chamber which is supported by ball bearings. The chamber, which includes a pin extending therefrom always extends vertically due to gravitational forces. By taking photographs of the pin relative to a background which inclines with the direction of the borehole, a determination of the inclination may be had. U.S. Pat. No. 2,616,187, to E. Young discloses the use of a fluid with an indicating element therein to provide an inclination and compass reading downhole via the use of a camera. U.S. Pat. No. 3,400,464 to R. Karol uses the chamber having some fluid which causes the core rod members of transformers to move relative to the armature coils of the transformers. Because the surface of the fluid will always be perpendicular to the vertical, the relative movement of the rods is used to provide an electrical signal which can be converted via calibration into an inclination determination. In somewhat of a similar vein, U.S. Pat. No. 3,137,077 to Rosenthal discloses an inclinometer which has a chamber partially filled with liquid and with two electrical elements which are spaced near or on the circumference of the chamber. When the chamber is inclined from the vertical, the liquid maintains its surface which is perpendicular to the vertical. The difference in electrical resistance of the elements is then used with calibration to provide an inclination determination.

It will be recognized by those skilled in the art that the inclinometers of the art as described above have various drawbacks. With regard to the devices that use photography, it is evident that such an arrangement is not only undesirable, but is also subject to large errors. With regard to the disclosed devices which use liquid surfaces and electrical readings, it is stated in the patents that the disclosed devices cannot work when there are torsional (rotational) movements of the tool. Thus, in order for proper measurements to be made, the chambers in the tools must be kept rotationally unvarying, thereby introducing other limitations and difficulties into the situation. Also, it will be appreciated that where the chambers are only partially filled with liquid, any bumping of the tool will cause a sloshing of the liquid, thereby either requiring a large settling time, or causing an inaccurate reading.

Another inclinometer is disclosed in U.S. Pat. No. 3,478,437 to W. Cothran. While the inclinometer was not disclosed with reference to use in a borehole, it does disclose a device which permits rotation. Thus, several conductor rings are placed circumferentially around a chamber which is partially filled with a conducting liquid. When the chamber is tilted, more conductors are brought into contact with the liquid, in effect acting as a short between some of the conductor rings. With each ring being connected to a resistor, the change in resistance permits a determination of the inclination of the chamber. However, because each ring must be separated from the others, the provided device only permits the inclination to be determined in finite steps, and such a poor resolution is often not adequate. The device, if it could be placed in a borehole setting, would also suffer from the sloshing problem common to the other liquid filled devices.

Finally, it should be noted that the patent to Rosenthal, U.S. Pat. No. 3,137,077 includes an embodiment as shown in FIG. 2 thereof which permits rotation of the inclinometer. The embodiment utilizes six elements rather than the two of the above-described embodiment and thereby permits two of the elements to be approximately properly placed to make an inclination determination. However, additional complication and error is introduced by such a six element design as the elements used in making the inclination determination may not be optimally located and interpolation would be required. Moreover, no measure of rotation is accomplished by such an arrangement.

SUMMARY OF THE INVENTION

It is therefore an object of the present invention to provide a high resolution inclinometer which in unaffected by rotation.

It is another object of the present invention to provide a high resolution inclinometer which is unaffected by rotation and which may additionally be used as a gauge of rotation.

It is a further object of the present invention to provide a high resolution inclinometer which is unaffected by rotation and which may be used in a borehole environment.

It is yet a further object of the present invention to provide a high resolution inclinometer, having no moving parts, which has a fast settling time for use in a borehole environment.

It is even a further object of the present invention to provide a high resolution, temperature corrected, electronic inclinometer and rotational gauge for use in a borehole or casing.

In accord with the objects of the invention the tool for measuring the angles of inclination and rotation generally comprises:

(a) an electrically nonconductive chamber containing a conductive fluid which partially fills the chamber;

(b) at least two wires oriented parallel to the longitudinal axis of the chamber and located at known distances from the longitudinal axis of the chamber at other than 180 degrees apart from each other, such that the surface of said conductive fluid may be defined by a point along each of the two wires together with a third point on the surface;

(c) electrical means attached to the wires for sensing an electrical characteristic of the wires corresponding to the points along the wires defined by the conductive fluid surface; and (d) means for using the sensed electrical characteristics of the wires, said known distances, and knowledge of the third point, and determining therefrom an index of inclination of said chamber.

Preferably, the chamber is cylindrical in shape and is filled half with the conductive fluid and half with a nonconductive fluid to prevent sloshing at the fluid interface. Also, preferably, the means for using the sensed electrical characteristics to determine an index of inclination also uses these characteristics and the knowledge of the third point to provide an index of rotation of the chamber. The electrical characteristics are typically resistance values which can be determined by injecting current into the wires and determining a resulting voltage.

It will also be seen, as described in detail hereinafter, that the third point which defines the surface plane of the conductive fluid may be known from the fact that under typical conditions (low amplitude shaking or jostling, and relatively steady motion) the point in the middle of the conductive liquid surface will remain constant when the chamber is totally filled with liquid. Thus, the middle point is a fixed distance away from the bottom of the chamber. Because this point is constant, if a third wire is run parallel to the other wires and through the middle of the chamber, the third wire may be used as a temperature gauge to correct the measured electrical characteristics of the other wires. It should also be appreciated that where a wire cannot be placed in the middle of the chamber due to the chamber being toroidal or the like, the fixed central point will still exist mathematically and can therefore still provide a third point which will define the plane of the conductive liquid surface. A third wire which is either entirely in contact with the conductive fluid or not in contact at all (e.g. at the bottom or top of the chamber) may then be used as corrective gauge. Additionally, if desired, more than two wires may be used around the perimeter of the chamber to define the planar liquid interface. With an arrangement having three wires on the perimeter, the wires are preferably placed at regular intervals of 120 degrees rather than the preferred ninety degree interval when two wires are used.

A better understanding of the invention, and additional advantages and objects of the invention will become apparent to those skilled in the art upon reference to the detailed description and the accompanying drawings.

DETAILED DESCRIPTION OF THE PREFERRED EMBODIMENT

Figure 1:
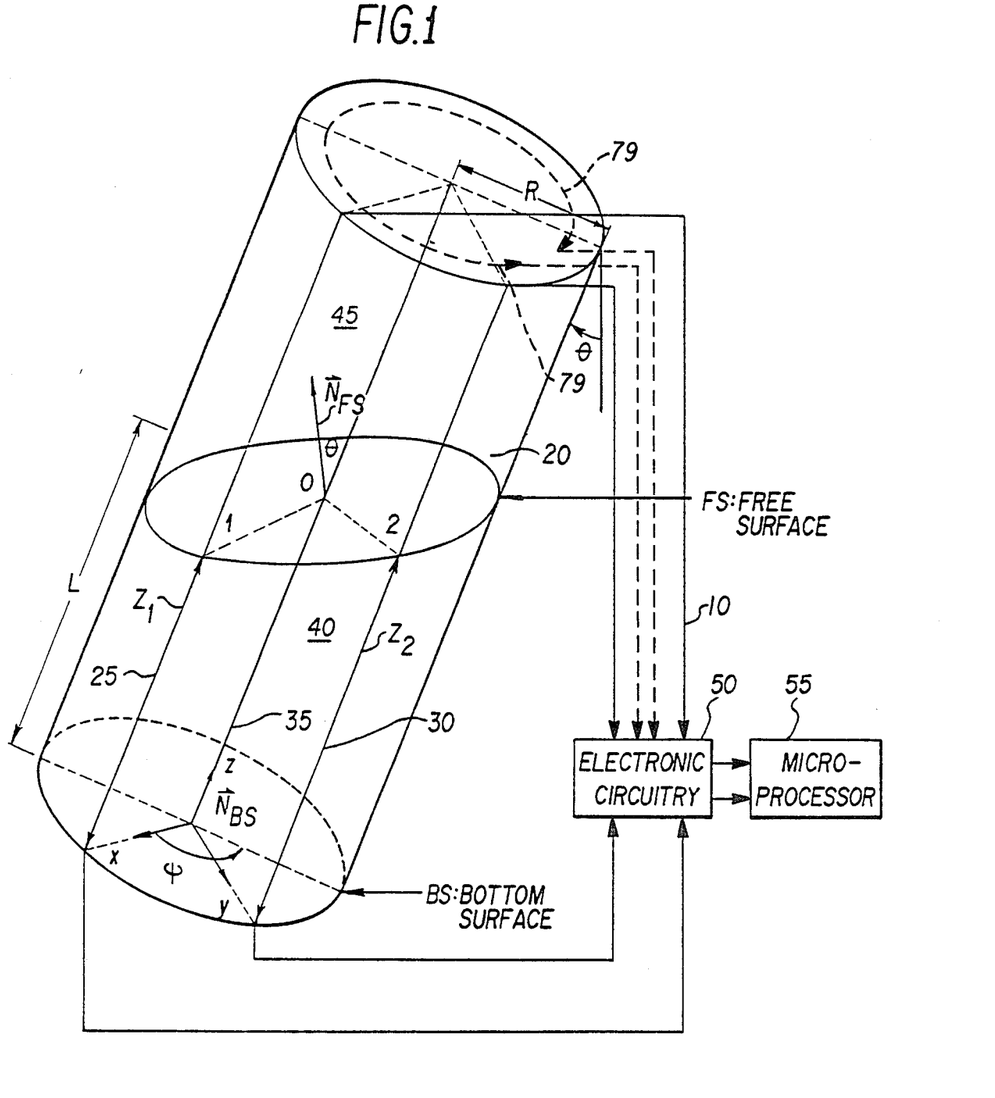
FIG. 1 is a simplified diagram schematically showing the basic components of the tool for measuring inclination and rotation, and also showing the various angles, surfaces, points, and distances which are helpful for understanding the invention.

Turning to FIG. 1, a tool 10 for measuring angles of inclination and rotation is seen. The tool 10 preferably includes an electrically non-conductive chamber 20, two conductive wires 25 and 30 which run along the length of the chamber 20, a third conductive wire 35 which runs parallel to the wires 25 and 30 through the center of the chamber 20, a conductive liquid 40 and a non-conductive liquid 45 contained in the chamber 20, and electronic circuitry 50 and a microprocessor 55 for obtaining desired electrical measurements and for processing them. The nonconductive chamber 20 may be constructed from methyl methacrylate ester polymer, or the like. However, any nonconductive material which is also nonreactive with borehole fluids, hydrocarbons, and the fluids which it is to hold may be used. Indeed, if desired, the chamber may be a hermetically sealed stainless steel exterior with a glass inner coating. For purposes herein, such a chamber shall be defined to be "nonconductive" as the chamber will not act as an electrical path for conductive wires placed thereon. The chamber 20 preferably has a round periphery (circumference), and as seen in the embodiment of FIG. 1 may be cylindrical in shape. The chamber 20 also preferably has a length to diameter ratio of at least three to one so that a dynamic range of inclination of at least sixty degrees is provided.

The wires 25 and 30 run along the entire length of the inner walls of the chamber 20 and, if desired, can be integral to the chamber itself such as by electrodepositing a film on the inner chamber wall. The wires 25 and 30 are optimally very thin high resistance wires and are preferably placed ninety degrees ($\pi/2$) apart from each other. In the embodiment of FIG. 1, a third wire 35 is also included and runs parallel to wires 25 and 30 but through the middle point of the chamber 20. All three wires are electrically connected to an electrical circuit which permits the electrical characteristics of the wires to be sensed. More particularly, and as will be described hereinafter with reference to FIG. 2, the wires may be connected to a voltage source or a current source so that a current or voltage which is representative of the length of wire extending in the nonconductive fluid may be determined.

As will be described hereinafter in a discussion of the theoretical basis of the invention, the chamber 20 is preferably half filled with a conductive fluid 40 such as saturated brine. Also, to prevent the sloshing of the conductive fluid 40 during movement of the chamber, the other half of chamber 20 is filled with a nonconductive fluid 45 such as a red dyed mineral oil "Soltrol", trademark of Phillips Petroleum of Bartlesville, Okla. While different liquids may be used, it is important that the interface between the liquids be flat, with a ninety degree contact angle to the chamber 20. Thus, the liquids should be very pure and clean, with no suspended solids. They should further be immiscible and preferably of considerably approximately equal densities, thereby reducing the possibility of emulsification during sloshing.

Figure 2:
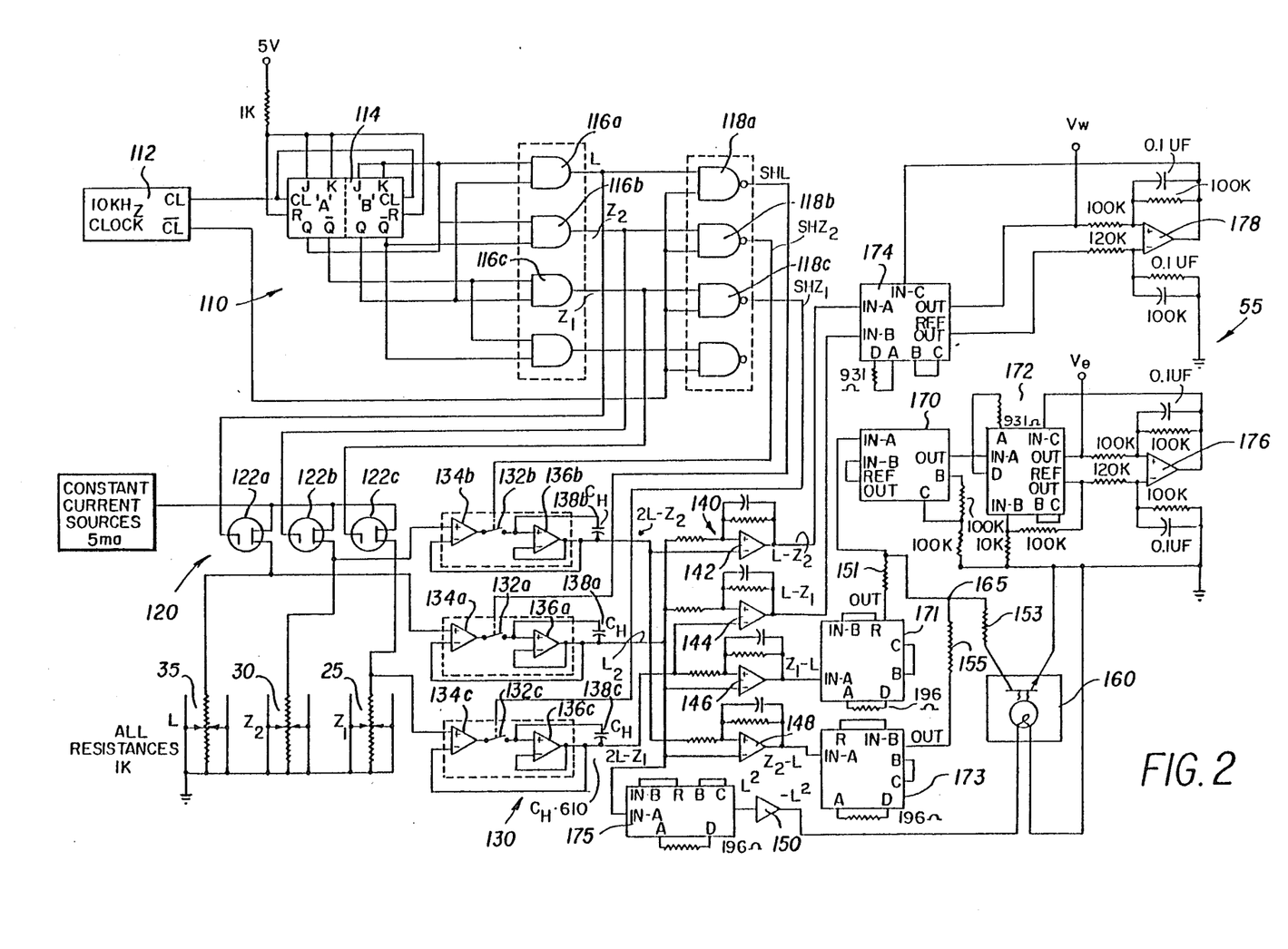
FIG. 2 is a circuit diagram showing an electronic circuit for determining inclination and rotation.

Before turning to FIG. 2 and discussing the details of the electronic circuitry 50 and the functions of the microprocessor 55, it is believed that the theoretical basis of the provided tool invention would be helpful. Thus, it will be appreciated that the top surface of any liquid will always remain parallel to the horizontal, regardless of the inclination of the cylinder in which it is contained. Of course, the same is true for the free surface FS between any two liquids. Indeed, the free surface between two liquids tends to remain more uninterrupted than the top surface of a single liquid when the container in which the liquid is contained is jostled because the upper liquid quickly dampens out the oscillations. Thus, it will be appreciated that the use of two liquids more easily permits measurements during movement of the chamber 20. In fact, if desired, measurements may be made over a period of time (e.g. five seconds) and averaged to ensure proper results.

As with any planar surface, the free surface FS between the two liquids may be defined uniquely by the coordinates of three noncolinear points located in the plane. As seen in FIG. 1, points "0", "1", and "2" can serve as those points, with each point being common to both a wire (35, 25, and 30 respectively) and the free surface FS. In fact, wire 35 is not required to serve as an identifier of the plane FS, as the middle point of the free surface interface will remain stationary enough under most borehole logging conditions. Thus, if the height L of the free surface FS from the bottom surface BS is known initially when the chamber 20 is vertical, the point "0" will always be located at the coordinates (0, 0, L) if the center point of the bottom surface BS is used as the origin of the coordinate system.

With wires 25 and 30 located at a ninety degree angle, and with the origin of the coordinate system located on the bottom surface BS of chamber 20, fixed point "0", and variable points "1", and "2" will have the following coordinates:

$$\text{point "0" } (x_0, y_0, z_0) = (0, 0, L) \tag{1}$$

$$\text{point "1" } (x_1, y_1, z_1) = (R, 0, Z_1) \tag{2}$$

$$\text{point "2" } (x_2, y_2, z_2) = (0, R, Z_2) \tag{3}$$

where R is the radius of the chamber 20, L is the known distance between the bottom surface origin and the center of the free surface, $Z_1$ is the length of wire 25 in the conductive fluid 40, and $Z_2$ is the length of wire 30 in the conductive fluid 40.

From a knowledge of the coordinates of the three points on the free surface FS, two vectors which also define the free surface may be defined:

$$\vec{01} = -\overline{(0, 0, L)} + \overline{(R, 0, Z_1)} = R\vec{i} + (Z_1 - L)\vec{k} \tag{4}$$

$$\vec{02} = -\overline{(0, 0, L)} + \overline{(0, R, Z_2)} = R\vec{j} + (Z_2 - L)\vec{k} \tag{5}$$

where $\vec{i}$, $\vec{j}$, and $\vec{k}$, are respectively the unit vectors along the x, y and z axes.

From, vectors $\vec{01}$ and $\vec{02}$, a vector normal to the free surface $\vec{N}_{FS}$ may be determined as the cross product of the vectors:

$$\vec{N}_{FS} = \vec{01} \times \vec{02} = (R\vec{i} + (Z_1 - L)\vec{k}) \times (R\vec{j} + (Z_2 - L)\vec{k}) \tag{6}$$

Also, by definition, the normal to the bottom surface BS may represented by the vector which connects the origin to point "0". Thus, $$\vec{N}_{BS} = L\vec{k} \tag{7}$$

Because the dot product of the unit vectors normal to the free surface and the bottom surface is equal to the cosine of the angle between normals, an index (the cosine) of the inclination angle $\sigma$ may be determined:

$$\cos \sigma = \vec{N}_{FS} \cdot \vec{N}_{BS} / \| \vec{N}_{FS} \| \, \| \vec{N}_{BS} \| \tag{8}$$

where $\| N_{FS} \|$ and $\| N_{BS} \|$ are respectively the normalizing vectors for vectors $\vec{N}_{FS}$ and $\vec{N}_{BS}$.

From equations (6) and (7), it is quickly seen that:

$$\vec{N}_{FS} \cdot \vec{N}_{BS} = R^2 L \tag{9}$$

Also, from equations (6) and (7), the normalizing vector values can be determined as:

$$\| \vec{N}_{FS} \| = \tag{10}$$
$$(R^2((Z_1 - L)^2 + (Z_2 - L)^2 + R^2)^{.5}$$

$$\| \vec{N}_{BS} \| = (L^2)^{.5} \tag{11}$$

Thus, from equations (8) through (11), it is seen that:

$$\cos \sigma = R/((Z_1 - L)^2 + (Z_2 - L)^2 + R^2)^{.5} \tag{12}$$

Or, if desired an index of the angle may be defined as the angle itself. Thus:

$$\sigma = \cos^{-1} R/((Z_1 - L)^2 + (Z_2 - L)^2 + R^2)^{.5} \tag{13}$$

Converting from the inverse cosine to the inverse tangent, it can also be shown that:

$$\sigma = \tan^{-1} [(((Z_1 - L)/R)^2 + ((Z_2 - L)/R)^2)^{.5}] \tag{14}$$

Thus, regardless of how the index of $\sigma$ is expressed, it will be appreciated that the angle of inclination may be determined by the three points "0", "1", and "2", simply by knowing values for R, L, $Z_1$, and $Z_2$ regardless of the rotation of the chamber around its z axis. Because R and L are known in advance, only $Z_1$ and $Z_2$ must be determined, and those determinations may be made according to the electronic circuitry 50 as will be described hereinafter. It should be understood that the term "index" as used herein is defined in its broadest sense such that an "index" of an angle can be (without limitation) a function of the angle (e.g.: cos; sin; tan; arccos; etc.), the angle itself (i.e. function=1), or a voltage or current which represents the angle.

Turning to the theoretical basis of the determination of the rotation of the tool or chamber 20 around its z axis, it should be recognized that the free surface FS of the liquids can be defined by the general equation:

$$ax + by + cz = L \tag{15}$$

where a, b, and c are determined by points "0", "1", and "2". Likewise, because the points defined by the intersection of the chamber wall with the free surface may be generally said to be points on a curve which may be measured from the x axis through an angle $\phi$ which rotates on the x-y plane, the x value may be stated as R cos $\phi$, while the y value may be stated as R sin$\phi$. Substituting the x and y values into equation (15), and solving for z, we get:

$$z = (L - R(a \cos \phi + b \sin \phi))/c \quad (16)$$

From FIG. 1, it is seen that z reaches a maximum when the angle is equal to $\phi^*$. Also by definition, z is a maximum when both $dz/d\phi = 0$, and $d^2z/d\phi^2 < 0$. Taking the derivative of z from equation (16):

$$dz/d\phi = (-R/c)(-a \sin \phi^* + b \cos \phi^*) = 0 \quad (17)$$

Thus, $a \sin \phi^* = b \cos \phi^*$, and $\tan \phi^* = b/a$. Or, $$\phi^* = \tan^{-1}(b/a) \quad (18)$$

At the same time, $d^2z/d\phi^2 = (R/c)(a \cos \phi^* + b \sin \phi^*)$ must be less than zero.

It is seen above that the rotation of the tool may be determined according to equation (18) which is expressed in terms of lengths b and a. However, substituting the coordinates of points "0", "1", and "2", into equation (15) for variables a, b, and c, it is found that:
cL = L, so that c = 1;
$aR + Z_1 = L$, so that $a = (L - Z_1)/R$; and
$bR + Z_2 = L$, so that $b = (L - Z_2)/R$.
Now, substituting the values for a and b into equation (18) it is seen that the angle or rotation from the x axis is defined as:

$$\phi^* = \tan^{-1}((L - Z_2)/(L - Z_1)) \quad (19)$$

Again, as with the determination of the inclination angle, since L is known in advance, a determination of $Z_1$ and $Z_2$ is all that is required to provide a rotational angle determination, and that determination is made by the electronic circuitry 50.

Before turning to FIG. 2, which provides a proposed circuit for determining the angle of inclination $\sigma$, and the angle of rotation 100, it should be understood that many different electrical means could be used for determining the same. What is required is a manner of determining lengths $Z_1$ and $Z_2$ along two wires 25 and 30 (or a function of the same). Because the lengths $Z_1$ and $Z_2$ are located in the conducting fluid, and the rest of the wires are located in the nonconducting fluid, it is apparent that any resistance provided by the wires is due to the lengths of the wires in the nonconducting fluid, as the conducting fluid acts as a short to remove resistances. Thus, in order for the lengths $Z_1$ and $Z_2$ to be determined, the lengths of the wires corresponding to the measured resistances must be subtracted from the total length of the wire, (i.e. $Z_1$ = total length − length in nonconducting fluid). In fact, if the nonconducting fluid was arranged to be located under the conducting fluid, or if the z lengths were defined from the top of the chamber to the liquid interface, the determination of $Z_1$ and $Z_2$ would be straightforward, as the measured resistances would be directly due to the z lengths themselves.

Figure 4:
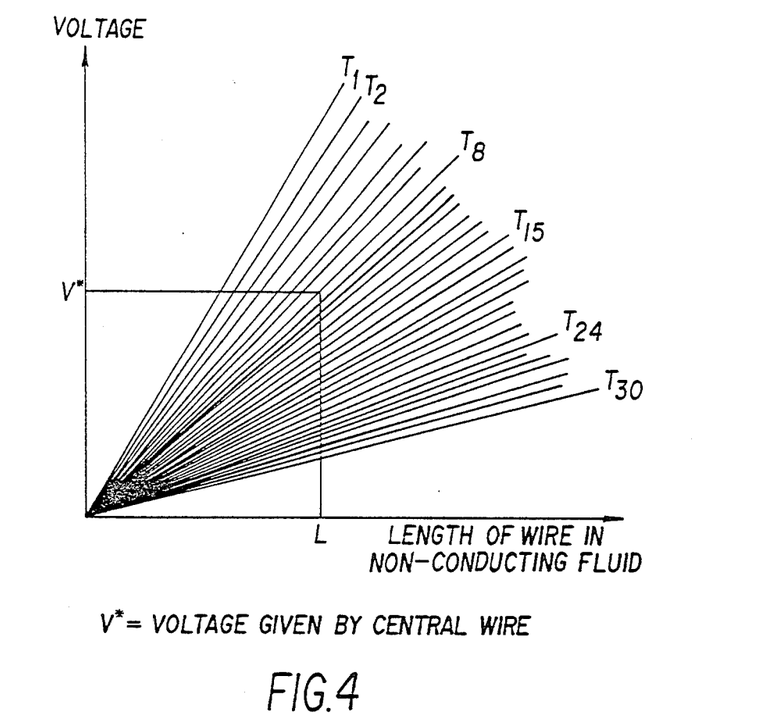
FIG. 4 is an example cross-plot which can be used to correlate the voltage output of the electronic circuit.

Any technique for determining the resistances of the wires 25 and 30 should suffice to determine lengths $Z_1$ and $Z_2$. Two such techniques would be to inject a current into the wires and measure the voltage which results, or to apply a voltage over the wire and measure the resulting currents. In either case it is desirable to take the results and process them according to a calibration for the particular tool to arrive at a length determination. In that regard, it should be noted that if a third wire 35 which runs through the point "0" is used in the tool, it may act as a calibrator. This derives from the fact that since the length of the wire 35 which is in the nonconducting fluid is always length L, any change in the electrical characteristics determined for wire 35 can be traced to extraneous factors such as the effect of temperature on the wire resistances, or changes in the electronic measuring system. In other words, absent extraneous factors, the response of the wire should be proportional to the length of the wire exposed to the nonconducting liquid. Thus, as seen in FIG. 4, using wire 35 as a calibrator, a temperature determination can be made by locating a temperature line which corresponds to the measured voltage V* for the center wire 35 which has a length L emerged in the nonconducting fluid. This additional information may then be used to help pick off points on calibration curves which are used to determine $Z_1$ and $Z_2$. In this manner, more accurate inclination angle and rotational angle determinations may be provided.

Turning to FIG. 2, a proposed circuit 50 and processor section 55 for providing voltage signals which are representative of the inclination and rotational angles of the chamber 20 is seen. The circuit 50 basically comprises a logic section 110 for controlling the timing of the circuit, a transistor switch section 120 for providing the wires 25, 30, and 35 with current, a sample and hold circuit section 130 for obtaining the voltages resulting from current having been sent through the wires, and a differential amplifier section 140 for computing various functions involving L, $Z_1$, and $Z_2$. The processor section 55 basically includes various processors for taking the results of the differential amplifier section, performing various functions such as the square, the square root and the arctan functions, and providing analog voltages which correspond to the inclination and rotational angles.

Figure 3:
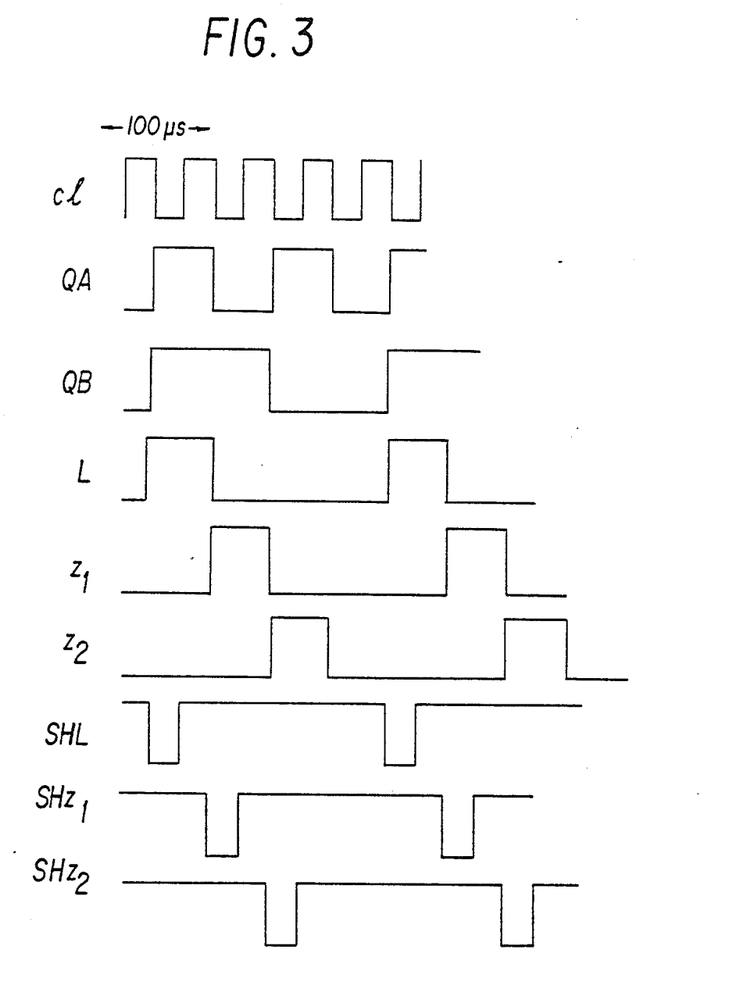
FIG. 3 is a timing diagram for the electronic circuit of FIG. 2.

Looking at FIG. 3 in conjunction with FIG. 2, it is seen that a clock 112 is included in the logic section 110 of circuit 50. The clock controls double flip-flop 114 which in turn provides outputs QA and QB which control AND gates 116a, 116b, and 116c. As indicated, the output of AND gate 116a is connected to FET 122a switch section 120, and as a result of the clocking and logic, current is provided in the form of a pulse to wire 35 (for determining length L) via AND gate 116a and FET 122a. Likewise, in succession, a pulse of current is provided to wire 30 (for determining length $Z_2$) via AND gate 116b and FET 122b, and to wire 25 (for determining length $Z_1$) via AND gate 116c and FET 122c. While each wire is receiving a current pulse, NAND gates 118a, 118b, and 118c are respectively turned on such that the switches 132a, 132b, and 132c of the sample and hold section 130 are closed. As a result amplifiers 134 and 136, and capacitors 138 are used to determine the voltage over the wires 25, 30, and 35. When switches 132a, 132b, and 132c are consequently opened by NAND gates 118a, 118b, and 118c respectively, the capacitors 138 will hold the determined voltages for further processing by the differential amplifier section 140.

Because differential amplifier 142 has its noninverting input connected to sample and hold amplifier 136b, and its inverting input connected to sample and hold amplifier 136a, the function performed by amplifier 142 and its associated circuitry is $(2L-Z_2)-L=L-Z_2$. Likewise, with its noninverting input connected to amplifier 136c, aand its inverting input connected to amplifier 136a, differential amplifier 144 performs the $L-Z_1$ function. Differential amplifier 146 performs a $(Z_1-L)$ function by having its noninverting input connected to amplifier 136a, and its inverting amplifier connected to amplifier 136c. Likewise, differential amplifier 148 performs a $(Z_2-L)$ function by having its noninverting input connected to amplifier 136a, and its inverting input connected to amplifier 136b. with the differential amplifier section 140 so arranged it will be appreciated that all the subtraction functions required by equations (14) and (19) are accomplished.

In the proposed circuitry of FIG. 2, the outputs of differential amplifiers 142, 144, 146, and 148 are fed to processor section 55. Processor section 55 is basically comprised of six processors 170, 171, 172, 173, 174 and 175 (which are all preferably AD538 chips manufactured by Analog Devices, Inc. of California and which function according to an article entitled "Multifunction IC Provides Diverse Math Functions", *EDN*, Aug. 22, 1985), resistors 151, 153, and 155, an inverter 150, opto isolator circuitry 160, and two amplifiers 176 and 178 which are all arranged to perform various functions which will provide an output which indexes the angles of rotation and inclination of chamber 20. Thus, to square the terms $Z_1-L$ and $Z_2-L$, the outputs from differential amplifiers 146 and 148 are fed into processors 171 and 173. Then, to divide the output of processors 171 and 173 by $R^2$, a resistor 151 is placed on the output of processor 171 and is arranged to have a value relative the resistor 153 which reflects the value of the square of the radius length R (i.e. the square of the distance from the center point of the chamber to the location of the wire 24 on the chamber circumference). Likewise, a resistor 155 is placed on the output of processor 173 and is arranged to have a value relative to the resistor 153 which reflects the square of the value of the chamber center point to the location of wire 30 on the chamber circumference. (Those skilled in the art should appreciate that the radius length "R" could be different for the wires 25 and 30 if the chamber is not cylindrical; resulting equation changes being elementary to one skilled in the art.) As will be described hereinafter with regard to temperature compensation, it should be appreciated that the ratios of resistor 153 to resistors 151 and 155 are varied according to the temperature sensed by wire 35. This is accomplished by using a processor 175 to square the L value, and then an inverter 150 to change the $L^2$ value to $-L^2$. The $-L^2$ value is then sent to opto isolator 160 which is connected in series to resistor 153. When the resistance of wire 35 increases, the voltage to the lamp of the opto isolator decreases, thereby increasing the resistance of the opto isolator 160 and raising the combined resistance of resistors 153 and 160.

To further perform the function required by equations (14) and (19), the voltage outputs from processors 171 and 173 are added at junction 165 and fed to processor 170. Processor 170 is configured to take the square root of the input and to output the result to processor 172. Processor 172, in conjunction with amplifier 176 is configured to take the input into processor 172 and to output the arctan of the input. Thus, the voltage output will be an index (i.e. is proportional) to the angle of inclination $\sigma$, as processors 170, 172, and amplifier 176 are arranged to complete equation (14). In a similar manner, the outputs from differential amplifiers 142 and 144 are sent to two of the inputs of processor 174 which is configured with amplifier 178 and associated circuitry to provide an index of the angle of rotation $\phi$ in accord with equation (19).

Those skilled in the art will appreciate that with the provided arrangement shown in FIG. 2, the wire 35 is acting as a calibrator (compensator) for the both the rotation and inclination angle determinations. Thus, for example with regard to the angle of rotation, if the temperature in the chamber 20 changed and caused the resistance wires 25, 30, and 35 to increase their resistances by a factor of 1.1, the output values of differential amplifiers 142 and 144 will each increase by a factor of 1.1. However, because processor 174 takes the ratio of the two, the factor of 1.1 cancels out as follows:

$$(1.1L-1.1Z_2)/(1.1L-1.1Z_1)=1.1(L-Z_2)/1.1(L-Z_1)=(L-Z_2)/(L-Z_1).$$

Thus, by measuring a value for L, a compensated (calibrated) value is calculated. The arctan of the calibrated value may then be determined. Likewise, with regard to the angle of inclination, if the temperature in the chamber 20 changed and caused the resistance of wires 25, 30, and 35 to increase by a factor of 1.1, the provided circuitry will provide an automatic compensation. This is true because the processor 175, the inverter 150 and the opto isolator 160 together will effectively increase the radius of the chamber by a factor of $(1.1)^2$ by changing the ratios of resistor 153 plus the opto isolator resistance to resistors 151 and 155. Thus, the processor 170 which performs the square root function takes the square root of the following:

$$((1.1Z_1-1.1L)^2/(1.1)^2R^2)+((1.1Z_2-1.1L)^2/(1.1)^2R^2)=((Z_1-L)/R)^2+((Z_2-L)/R)^2$$

exactly as is required by equation (14). Thus, the wire 35, the processor 175, the inverter 150, and the opto isolator 160 act together to provide a built in temperature compensation for the apparatus.

Figure 5:
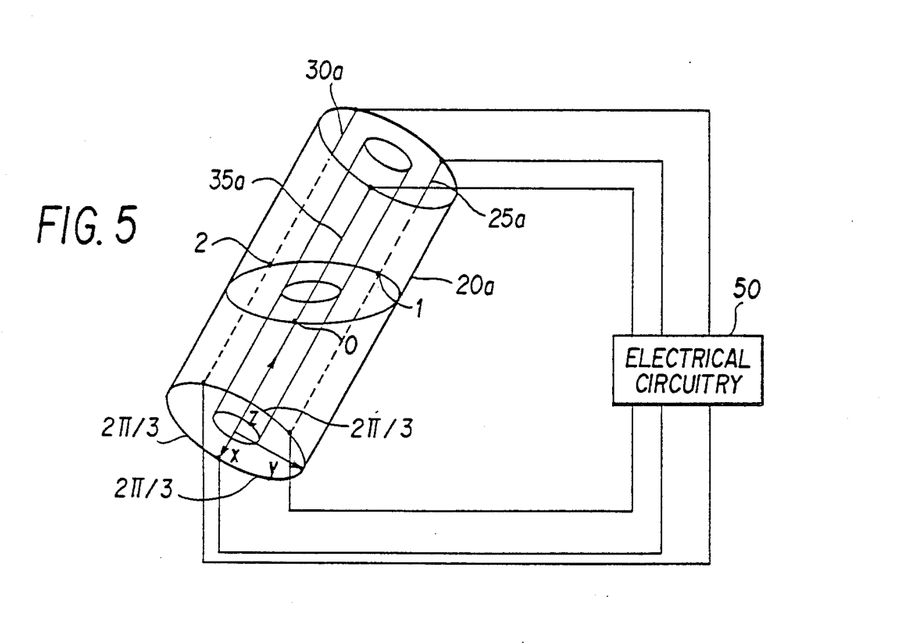
FIG. 5 is a simplified schematic diagram showing an alternative embodiment to the tool of FIG. 1.

Before turning to FIG. 5, it is of note with regard to the embodiment of FIG. 1, that even where a central wire 35 is not used, the central point defined by length L is still mathematically available for defining the fluid interface plane. Thus, a simple two wire configuration may be used for the angle of rotation and angle of inclination determinations. However, if temperature compensation is desired, a wire may be placed along the top inner surface of the chamber (such as wire 79 seen in phantom) in the nonconducting fluid. Because the conducting fluid should never reach the top surface, and because the fixed length of such a wire would be known, any change in the resistance determination with regard to that wire would provide the same information as had been provided by the central wire 35.

Turning to FIG. 5, an alternative embodiment of the invention is shown where the chamber 20a takes an annular cylindrical shape rather than the cylindrical shape of FIG. 1. With this arrangement, a flow meter such as a Venturi-type flow meter may be located in the central void of the chamber 20a, but a central wire such as wire 35 of FIG. 1 may not be used. Instead of using the two wire embodiment suggested above, another arrangement which will allow a determination of the angles of inclination and rotation is shown in FIG. 5. The alternative embodiment uses three wires 25a, 30a, and 35a along the inner surface of the outer wall of chamber 20a. With the three wires being evenly spaced at 120 degrees around the circumference, and with point "0" being defined as located along the x axis, it will be seen that points "0", "1", and "2", have the following coordinates:

$$\text{point "0"}(x_0, y_0, z_0) = (R, 0, Z_0) \quad (20)$$

$$\text{point "1"}(x_1, y_1, z_1) = (-R/2, \sqrt{3}R/2, Z_1) \quad (21)$$

$$\text{point "2"}(x_2, y_2, z_2) = (-R/2, -\sqrt{3}R/2, Z_2) \quad (22)$$

With the points so defined, two vectors on the liquid interface surface which define the plane can be defined. Then, as described above, the normal to the surface may be computed by taking the cross product of the two vectors. Since the normal to the bottom surface of the chamber 20a is identical to the normal of the bottom surface of chamber 20 described with regard to FIG. 1, a dot product of unit vectors of the normal vectors to the surfaces may be calculated, with the cosine of the inclination angle $\sigma$ equalling the dot product. Thus, it can be shown that with the arrangement provided in FIG. 5, the inclination angle $\sigma$ is:

$$\theta = \cos^{-1}\left[\frac{\sqrt{3}\,R/2}{(.75(Z_0-L)^2 + (Z_1 - L + (Z_0-L)/2)^2 + .75R^2)^{.5}}\right] \quad (23)$$

Equation (23) is rather interesting because the only unknowns it contains are $Z_0$ and $Z_1$ (and L). Thus, it is evident that three wires around the outer wall of chamber 20a are not required for determining the angle of inclination, as only two points which are defined by the wires are used in equation (23). In particular, it should be appreciated that even where the chamber 20a is shaped as an annular cylinder, the central point may still be defined by length L, and may still be used to define the plane of the liquid surface. Indeed, the reason equation (23) differs from equation (13) is simply because the wires are placed at a one hundred twenty degree spacing rather than at ninety degrees. It will also be appreciated with regard to FIG. 5 that if calibration is required for temperature changes or the like, a wire of fixed length can be placed along the top or bottom surface of chamber 20a as aforedescribed depending on where the nonconductive fluid is located.

Since the arrangement having three wires spaced around the outer circumference of chamber 20a is not required for a determination of the angle of inclination, it follows that it would not be required for determining a rotational angle for a chamber such as chamber 20a. However, again, a review of such an arrangement is advantageous. Thus, following the procedures set forth with regard to determining the angle of inclination in the embodiment of FIG. 1, the location of points "0", "1", and "2", as defined in equations (20) through (22) may be inserted into equation (15) to provide three equations. By following the equivalents of equations (16) trough (18) it can be seen that the angle of rotation $\phi$ is given by the arctan (b/a). Then, using the three provided equations, it will be found that variables a and b are defined as follows:

$$a = (Z_1 + Z_2 - 2Z_0)/R(Z_0 + Z_1 + Z_2)$$

$$b = \sqrt{3}(Z_2 - Z_1)/R(Z_0 + Z_1 + Z_2)$$

Thus, the angle of rotation $\phi$ is found:

$$\phi = \arctan\left[\sqrt{3}(Z_2 - Z_1)/(Z_1 + Z_2 - 2Z_0)\right] \quad (24)$$

In equation (24), all three z values are required for a determination of the angle of rotation. Those skilled in the art, however, will appreciate that this result obtains from the fact that equation (15) includes the use of all three points and that unlike the embodiment of FIG. 1 where the third point had coordinates of (0, 0, L), the third coordinate of FIG. 5 has an unknown z value.

There has been described and illustrated herein tools and methods in accordance with the present invention for determining the inclination angle and rotational angle of an object. While particular embodiments of the present invention have been described, it is intended that the invention be broad in scope and that the specifications be read likewise. Thus, while particular circuitry for measuring the lengths of wires in the nonconductive fluid and for carrying out the mathematical equations for determining the angles was suggested, those skilled in the art could provide other circuitry for accomplishing the same. Indeed, as indicated, the invention is intended to encompass the determination of indicia of the angles (cosine, sine, tangent etc.), and those skilled in the art may apply different circuits and/or different known processors for accomplishing the same.

Further, it should be recognized that while the provided embodiments proposed particular angles (ninety and one-hundred and twenty) between the sensing wires, other angles can be utilized. What it critical is the understanding that the surface of the liquid can be defined by two vectors which result from three known or determinable points, and that the angle of inclination may be determined therefrom. Moreover, the chamber containing the liquids may take various shapes other than those proposed, provided, of course, that the three points defining the joint surface of the liquids are either known or determinable. Therefore, it will be apparent to those skilled in the art that other changes and modifications may be made to the invention as described in the specification without departing from the spirit and scope of the invention as so claimed.

We claim:
1. An apparatus, comprising:
   (a) an electrically nonconductive chamber defining a central longitudinal axis, said chamber containing a conductive liquid which partially fills said chamber;
   (b) at least two wires oriented parallel to said longitudinal axis of said chamber and located about said chamber at other than a 180 degree rotation around said axis, wherein a surface of said conductive liquid may be defined by a point along the length of each of said two wires along with a third point on said surface;
   (c) electrical means attached to said wires for sensing an electrical characteristic of each of said wires corresponding to said points along said wires defined by said conductive liquid surface; and

(d) means for using at least said sensed electrical characteristics of said wires and knowledge of said third point, and determining therefrom in accord with at least one trigonometric function at least one index selected from a group consisting of an index of inclination and an index of rotation of said chamber.

2. An apparatus according to claim 1, wherein:
said chamber further includes a nonconductive liquid, and said conductive liquid and nonconductive liquid totally fill said chamber.

3. An apparatus according to claim 2, wherein:
said chamber comprises an outer wall having an inner surface, and said inner surface of said chamber is circular.

4. An apparatus according to claim 3, wherein:
said at least two wires are located along said inside surface of said outer wall of said chamber.

5. An apparatus according to claim 4, wherein:
said third point is defined by an intersection of said longitudinal axis of said chamber and an interface between said liquid.

6. An apparatus according to claim 5, wherein:
said at least two wires comprises at least three wires, wherein said third wire is located along said longitudinal axis of said chamber, and wherein said at least said third wire is used to provide at least temperature compensation information.

7. An apparatus according to claim 5, wherein:
said chamber further comprises a top and bottom walls having top and bottom wall inner surfaces, and
said at least two wires comprises at least three wires, wherein said third wire is located substantially along one of said top and bottom wall inner surfaces of said chamber such that said third wire is entirely immersed in said nonconductive liquid.

8. An apparatus according to claim 5, wherein:
said first and second wires are located at a known distance from said longitudinal axis of said chamber, and said index of inclination is determined according to a function of of $Z_1$, $Z_2$, L, and R wherein
R is said known distance from said longitudinal axis of said chamber,
L represents the length of said longitudinal axis from the bottom surface of said chamber to said third point,
$Z_1$ represents the length of a first of said two wires from said bottom surface of said chamber to the intersection of said first wire and said liquid interface, and
$Z_2$ represents the length of a second of said two wires from said bottom surface of said chamber to the intersection of said second wire and said liquid interface.

9. An apparatus according to claim 8, wherein:
said two wires are located about said chamber at a rotation about said central longitudinal axis of ninety degrees relative to each other, and said means for determining an index determines said index according to said trigonometric function $$\sigma = \tan^{-1}[((Z_1-L)/R)^2+((Z_2-L)/R^2)^{.5}]$$

where $\sigma$ is the angle of inclination.

10. An apparatus according to claim 9, wherein:
said at lest two wires comprises at least three wires, wherein said third wire is located along said longitudinal axis of said chamber, and wherein said at least said third wire is used to provide at least temperature compensation for said determination of $Z_1$, $Z_2$, and R.

11. An apparatus according to claim 1, wherein:
said sensed electrical characteristic is a resistance of said at least two wires.

12. An apparatus according to claim 11, wherein:
said resistances of said two wires is obtained by injecting current into said wires and measuring resulting voltages over said wires.

13. An apparatus according to claim 7, wherein:
said chamber is arranged in the shape of an annular cylinder.

14. An apparatus according to claim 1, wherein:
said first and second wires at located at a known distance from said longitudinal axis of said chamber, and said index of rotation is determined according to a function of $Z_1$, $Z_2$, and L, where
L represents a length of said longitudinal axis from a bottom of said chamber to said third point,
$Z_1$ represents a length of a first of said two wires from said bottom of said chamber to an intersection of said first wire and said liquid surface, and
$Z_2$ represents a length of a second of said two wires from said bottom of said chamber to an intersection of said second wire and said liquid surface.

15. An apparatus according to claim 14, wherein:
said two wires are located about said chamber at a rotation about said central longitudinal axis of ninety degrees relative to each other, and said means for determining an index determines said index according to said trigonometric function $$\phi^* = \tan^{-1}((L-Z_2)/(L-Z_1))$$

where $\phi^*$ is said angle of rotation.

16. An apparatus according to claim 5, wherein:
said first and second wires are located at a known distance from said longitudinal axis of said chamber, and said index of inclination is determined according to a function of $Z_1$, $Z_2$, L, and R, wherein said function of $Z_1$, $Z_2$, L, and R, is a function of said at least one trigonometric function and said index of rotation is determined according to a function of $Z_1$, $Z_2$, and L, wherein said function of $Z_1$, $Z_2$, and L is a second of said at least one trigonometric function, wherein
R is said known distance from said longitudinal axis of said chamber,
L represents a length of said longitudinal axis from a bottom of said chamber to said third point,
$Z_1$ represents a length of a first of said two wires from said bottom of said chamber to an intersection of said first wire and said liquid interface, and
$Z_2$ represents a length of a second of said two wires from said bottom of said chamber to an intersection of said second wire and said liquid interface.

17. A method of determining an angular index for a tool, comprising:
(a) placing a tool at at least one of an angle of inclination and an angle of rotation, said tool having
(1) an electrically nonconductive chamber defining a central longitudinal axis, said chamber containing a conductive liquid which partially fills said chamber;
(2) at least two wires oriented parallel to said longitudinal axis of said chamber and located about said chamber at other than a 180 degree rotation around said axis, wherein a surface of said conductive liquid may be defined by a point along the length of each of said two wires along with a third point on said surface, (3) electrical means attached to said wires, and (4) processing means;

(b) sensing with said electrical means an electrical characteristic of each of said wires corresponding to said points along said wires defined by said conductive liquid surface; and (c) processing said sensed electrical characteristics of said wires and knowledge of said third point with said processing means, and determining therefrom in accord with at least one trigonometric function at least one said angular index selected from a group consisting of an index of inclination and an index of rotation of said tool.

18. A method according to claim 17, wherein:

said sensing step includes sampling said electrical characteristics over a predetermined period of time, and said processing steps includes averaging said sensed electrical characteristics to provide said at least one index.

19. A method according to claim 17, wherein:

said sensing step includes injecting current into said wires and measuring resulting voltages over said wires.

20. A method according to claim 17, wherein:

said tool further includes a third wire running along said longitudinal axis of said chamber;

said sensing step includes sensing said electrical characteristic along said third wire to provide at least an index of temperature compensation; and said processing step includes using said temperature compensation to provide at least one compensated index.

* * * * *

UNITED STATES PATENT AND TRADEMARK OFFICE
CERTIFICATE OF CORRECTION

PATENT NO. : 4,779,353

DATED : October 25, 1988

INVENTOR(S) : Lopes et al.

It is certified that error appears in the above-identified patent and that said Letters Patent is hereby corrected as shown below:

On title page, in the INVENTOR section, change "Gary S. Stumolo" to -- Gary S. Strumulo --.

Signed and Sealed this

Eleventh Day of July, 1989

Attest:

DONALD J. QUIGG

*Attesting Officer*  *Commissioner of Patents and Trademarks*